United States Patent
Seal et al.

(10) Patent No.: US 9,819,515 B1
(45) Date of Patent: Nov. 14, 2017

(54) INTEGRATED FABRIC ADAPTER AND ASSOCIATED METHODS THEREOF

(71) Applicant: QLOGIC Corporation, Aliso Viejo, CA (US)

(72) Inventors: Abhijit Seal, San Jose, CA (US); Manoj Wadekar, San Jose, CA (US)

(73) Assignee: QLOGIC Corporation, Aliso Viejo, CA (US)

( * ) Notice: Subject to any disclaimer, the term of this patent is extended or adjusted under 35 U.S.C. 154(b) by 214 days.

(21) Appl. No.: 14/724,273

(22) Filed: May 28, 2015

Related U.S. Application Data (60) Provisional application No. 62/028,617, filed on Jul. 24, 2014.

(51) Int. Cl.
*H04L 12/46* (2006.01)
*H04L 12/741* (2013.01)

(52) U.S. Cl.
CPC .......... *H04L 12/4641* (2013.01); *H04L 45/74* (2013.01)

(58) Field of Classification Search
CPC ... H04L 12/4641; H04L 45/74; H04L 45/586; H04L 45/742; H04L 45/745; H04L 12/46; H04L 45/00; H04L 45/58; H04L 12/5689
USPC ....................................................... 370/392
See application file for complete search history.

(56) References Cited

U.S. PATENT DOCUMENTS

| | | | | |
|---|---|---|---|---|
| 2008/0084881 A1* | 4/2008 | Dharwadkar | ....... | H04L 12/4641 370/392 |
| 2010/0158024 A1* | 6/2010 | Sajassi | ................ | H04L 12/4625 370/401 |
| 2013/0061047 A1* | 3/2013 | Sridharan | ............. | H04L 45/586 713/162 |
| 2013/0195105 A1* | 8/2013 | Basso | ..................... | H04L 45/72 370/389 |
| 2014/0056317 A1* | 2/2014 | Sanders | ................ | H04J 3/1629 370/474 |
| 2014/0185611 A1* | 7/2014 | Lie | .......................... | H04L 49/25 370/355 |
| 2015/0016286 A1* | 1/2015 | Ganichev | ............. | H04L 45/586 370/252 |

* cited by examiner

*Primary Examiner* — Michael Thier
*Assistant Examiner* — Rownak Islam
(74) *Attorney, Agent, or Firm* — Klein, O'Neill & Singh, LLP (57) ABSTRACT

Methods and systems for network communication are provided. A method includes maintaining a first segment of a routing data structure at a first switching module of a network adapter for routing a frame between virtual machines executed by a computing device operationally coupled to the network adapter; maintaining a second segment of the routing data structure at a second switching module for routing a frame received at a port of the network adapter to an external destination; receiving a frame from the computing device and using the first segment by the first switching module to route the frame to a destination virtual machine; and receiving a frame at a port of the network adapter and using the second segment of the routing structure by the second switching module to the route the frame to its destination without providing the frame to the computing device.

20 Claims, 8 Drawing Sheets

INTEGRATED FABRIC ADAPTER AND ASSOCIATED METHODS THEREOF

CROSS-REFERENCE TO RELATED APPLICATION

This patent application claims priority under 35 USC 119(e) to U.S. Provisional Patent Application Ser. No. 62/028,617, entitled "Integrated Fabric Adapter", filed on Jul. 24, 2014, the disclosure of which is incorporated herein by reference in its entirety.

TECHNICAL FIELD

The present aspects relate to network systems and devices, and more particularly to network adapters providing network connectivity to computing devices.

BACKGROUND

A computer network, often simply referred to as a network, is a group of interconnected computers, servers and devices that facilitates communication among users and allows users to share resources. Adapters (may also be referred to as network interface cards), switches, and other devices are typically used during network communication for reading and writing data at mass storage devices.

In conventional networks, switch hardware typically has the intelligence to route frames. Servers and switches are typically implemented and deployed in separate hardware devices. With software defined networks, the trend is to diminish reliance on just hardware based switches for reducing costs and improving efficiency. Continuous efforts are being made to improve network communication.

SUMMARY

The present aspects have several features, no single one of which is solely responsible for their desirable attributes. Without limiting the scope of the present aspects as expressed by the claims that follow, their more prominent features now will be discussed briefly. After considering this discussion, and particularly after reading the section entitled "Detailed Description," one will understand how the features of the present aspects provide the advantages described herein.

In one aspect, a machine implemented method is provided. The method includes maintaining a first segment of a routing data structure at a first switching module of a network adapter for routing a frame between virtual machines executed by a computing device operationally coupled to the network adapter; maintaining a second segment of the routing data structure at a second switching module for routing a frame received at a port of the network adapter to a destination external to the network adapter and the computing device; receiving a frame from the computing device and using the first segment by the first switching module to route the frame to a destination virtual machine; and receiving a frame at a port of the network adapter and using the second segment of the routing structure by the second switching module to the route the frame to its destination without providing the frame to the computing device.

In another aspect, a network adapter having a first switching module for routing a frame between virtual machines executed by a computing device; and a second switching module for routing a frame received at a port of the network adapter to a destination external to the network adapter and the computing device is provided. The network adapter maintains a routing data structure for routing the frame to one of the virtual machines and for routing the frame received at the port of the network adapter to the external destination without providing the frame to the computing device.

In yet another aspect, a system is provided. The system includes a computing device having a processor executing instructions out of a memory device for executing a plurality of virtual machines; and a network adapter operationally coupled to the computing device having a plurality or ports for sending and receiving information via a network. The network adapter includes a first switching module for routing a frame between the plurality of virtual machines; and a second switching module for routing a frame received at a port of the network adapter to a destination external to the network adapter and the computing device. The network adapter maintains a routing data structure for routing the frame to one of the virtual machines and for routing the frame received at the port of the network adapter to the external destination without providing the frame to the computing device.

This brief summary has been provided so that the nature of the disclosure may be understood quickly. A more complete understanding of the disclosure can be obtained by reference to the following detailed description of the embodiments thereof concerning the attached drawings.

BRIEF DESCRIPTION OF THE DRAWINGS

The various present aspects will be discussed in detail with an emphasis on highlighting the advantageous features. These aspects depict the novel and non-obvious systems and methods for quality of service in networks shown in the accompanying drawings, which are for illustrative purposes only. These drawings include the following figures, in which like numerals indicate like parts.

DETAILED DESCRIPTION

The following detailed description describes the present aspects with reference to the drawings. In the drawings, reference numbers label elements of the present aspects. These reference numbers are reproduced below in connection with the discussion of the corresponding drawing features.

As a preliminary note, any of the aspects described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs—Central Processing Unit(s)). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single or multiple software program(s), firmware program(s), and/or hardware unit(s). The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.).

The various aspects disclosed herein, may be implemented as a computer process (method), a computing system, or as an article of manufacture, such as a computer program product or a non-transitory computer-readable media. The computer program product may be non-transitory computer storage media, readable by a computer device, and encoding a computer program of instructions for executing a computer process.

Various network standards and protocols may be used to enable network communications to access storage devices/storage space, including Ethernet, Fibre Channel over Ethernet (FCoE), iSCSI (Internet Small Computer System Interface, i.e. mapping SCSI over TCP/IP (Transmission Control Protocol/Internet Protocol)), Fibre Channel (FC), Internet Protocol (IP), and others. Below is a brief introduction to some of these standards. The present aspects are described herein with reference to the iSCSI, IP, and Ethernet Protocols. However, these protocols are used merely for ease of reference and to provide examples. The present aspects are not limited to IP, iSCSI, and Ethernet.

Ethernet is a family of computer networking technologies for local area networks (LANs). Systems communicating over Ethernet divide a stream of data into individual packets called frames (the term packet and frames is used interchangeably throughout this specification). Each frame includes source and destination addresses and error-checking data so that damaged data can be detected and re-transmitted. Ethernet is standardized in IEEE 802.3, which is incorporated herein by reference in its entirety.

FCoE is a converged network and storage protocol for handling both network and storage traffic. The FCoE standard enables network adapters and network switches to handle both network and storage traffic using network and storage protocols. Under FCoE, Fibre Channel frames are encapsulated in Ethernet frames. Encapsulation allows Fibre Channel to use 1 Gigabit Ethernet networks (or higher speeds) while preserving the Fibre Channel protocol.

Fibre Channel (FC) technology is based on a set of American National Standards Institute (ANSI) standards. Fibre Channel provides a serial transmission protocol for storage and network protocols such as HIPPI, SCSI, IP (Internet Protocol), ATM (Asynchronous Transfer Mode) and others. Fibre Channel provides an input/output interface to meet the requirements of both Channel and network users. Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

iSCSI is an Internet Protocol (IP)-based storage networking standard for linking data storage facilities. By carrying SCSI commands over IP networks, iSCSI is used to facilitate data transfers over intranets and to manage storage over long distances. iSCSI can be used to transmit data over local area networks (LANs), wide area networks (WANs), or the Internet and can enable location-independent data storage and retrieval. The protocol allows clients (called initiators) to send SCSI commands (also known as Command Descriptor Blocks or CDBs) to SCSI storage devices (called targets) on remote servers. It is a SAN protocol, allowing organizations to consolidate storage into data center storage arrays while providing host applications with the illusion of locally attached disks. Unlike traditional Fibre Channel, which requires special-purpose cabling, iSCSI can be run over long distances using existing network infrastructure.

The systems and processes described below are applicable and useful in the cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet (or any other network) and cloud computing allows shared resources, for example, software and information, to be available, on-demand, like a public utility.

Typical cloud computing controllers (managed by cloud providers and may be referred to interchangeably) deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

In one aspect, methods and systems for network communication are provided. For example, a method is provided that includes maintaining a first segment of a routing data structure at a first switching module of a network adapter for routing a frame between virtual machines executed by a computing device operationally coupled to the network adapter; maintaining a second segment of the routing data structure at a second switching module for routing a frame received at a port of the network adapter to a destination external to the network adapter and the computing device; receiving a frame from the computing device and using the first segment by the first switching module to route the frame to a destination virtual machine; and receiving a frame at a port of the network adapter and using the second segment of the routing structure by the second switching module to the route the frame to its destination without providing the frame to the computing device.

Figure 1A:
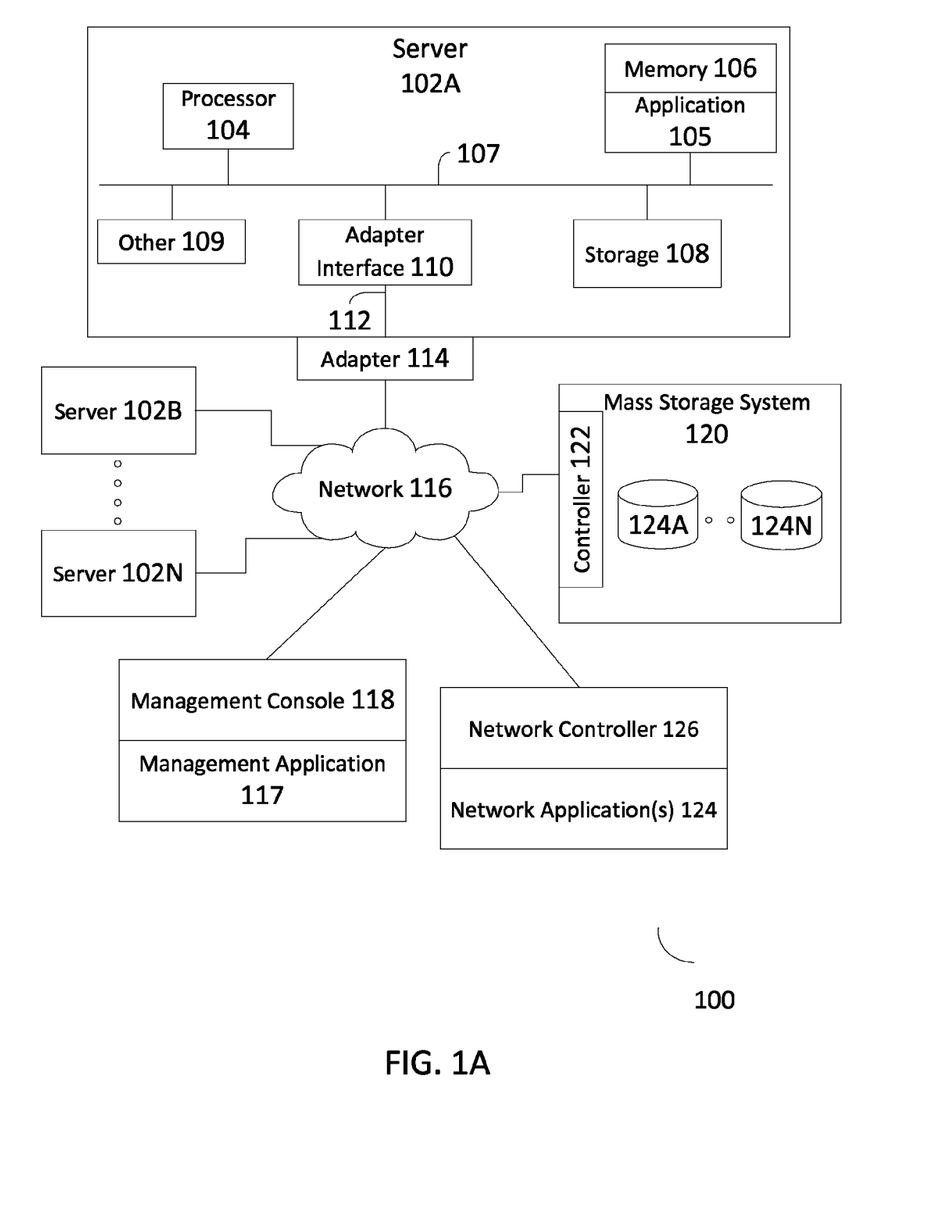
FIG. 1A is a block diagram of a networked system that may utilize the teachings of the disclosures herein.

System 100:

FIG. 1A is a block diagram of a system 100 configured for use with the various aspects of the present disclosure. System 100 may include a plurality of computing systems 102A-102N (which may also be referred to generally as server(s) 102 or host system(s) 102), each coupled to an adapter 114 that interfaces with other devices, as described below in more detail. Adapter 114 may be referred to as a network interface card that provides connectivity to network 116.

The computing system 102 may include one or more processors 104, also known as central processing units (CPUs). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

Processor 104 executes machine implemented instructions (or process steps/blocks) out of a memory 106 and interfaces with an interconnect 107 that may be referred to as a computer bus 107. The computer bus 107 may be, for example, a system bus, a Peripheral Component Interconnect (PCI) bus, PCI-Express (PCIe) bus, a HyperTransport or industry standard architecture bus, a SCSI bus, a universal serial bus (USB), an Institute of Electrical and Electronics Engineers (IEEE) standard 1394 bus (sometimes referred to as "Firewire"), or any other type of bus.

The host system 102 may further include a storage device 108, which may include, for example, a hard disk (HDD), a CD-ROM, a non-volatile memory device (flash or memory stick), a hybrid drive (sometimes referred to as SSHD), or any other storage device for storing structured or unstructured data. Storage 108 may store operating system program files (or data containers) and/or application program files, for example, email applications, database applications, management applications, and other application files. Some of these files are stored on storage 108 using an installation program. For example, the processor 104 may execute computer-executable process steps of an installation program so that the processor 104 can properly execute the application program.

Memory 106 also interfaces with the computer bus 107 to provide the processor 104 with access to memory 106. Memory 106 may include random access main memory (RAM). When executing stored computer-executable process steps from storage 108, the processor 104 may store and execute the process steps out of memory 106. Read only memory (ROM, not shown) may also be used to store invariant instruction sequences, such as start-up instruction sequences or basic input/output system (BIOS) sequences for operation of a keyboard (not shown).

In one aspect, processor 104 may execute an application 105 for performing certain functions. For example, application 105 may be a database application, a virtual machine executed in a virtual environment (provided by VMware Corporation, Microsoft Corporation or any other entity), an electronic email application (for example, Microsoft Exchange), or any other application type. Application 105 may issue read and write requests that are processed by adapter 114, as described below in more detail. Application 105 may also be referred to as a "client."

The host system 102 also includes other devices and interfaces 109, which may include a display device interface, a keyboard interface, a pointing device interface and others. The details of these components are not germane to the inventive aspects.

Adapter 114 may be configured to handle both network and storage traffic while interfacing with other elements. In one aspect, as described below in detail, adapter 114 may comprise a network interface card (NIC) or any other device for facilitating communication over the network 116. The adapter 114 may include a converged network adapter for processing information complying with storage and network protocols, for example, Ethernet, FCoE and others.

The computing system 102 uses an adapter interface 110 to communicate with adapter 114 via a link 112. In one aspect, link 112 may be a PCI-Express link or any other interconnect type. The adaptive aspects disclosed herein are not limited to any particular link type.

Adapter 114 may communicate and interface with a mass storage system 120 via a network 116 that may include one or more switch(es) (may be referred to as fabric switch) and/or routers. Network 116 may include a storage attached network (SAN), a local area network (LAN), a wide area network (WAN), and/or a converged network. The mass storage system 120 may include a plurality of storage devices 124A-124N. Storage space at storage devices 124A-124N may be presented as SAN LUNs to application 105 via network 116. Controller 122 of mass storage system 120 may be used to manage storage devices 124A-124N. In one aspect, controller 122 may include a processor, an adapter 114 and other similar components.

System 100 may also include a management console 118, used according to one aspect. Management console 118 may be a computer system similar to computing system 102 described above in detail. Management console 118 executes a management application 117 that may be used to configure storage space as logical structures (for example, as logical entities referred to as logical unit numbers (LUNs)) that are presented to computing systems 102-102N for storing information. Permissions associated with a LUN may also be configured using management application 117. The permissions indicate which entities may be allowed to access a LUN to read and/or write information. In another aspect, management application 117 may also be referred to as IFA (Integrated Fabric Adapter) Controller, where it is used to manage and configure one or more IFA clusters using the Open Flow Specification, as described below in detail.

System 100 may also include a network controller 126, used according to one aspect. Network controller 126 also may comprise a computer system similar to computing system 102 described above in detail or may be a simplified network-connected device. In general, network controller 126 is a central controller that executes one or more network applications 124 that, in turn, program various other devices on the network 116 as described in more detail herein. It is noteworthy that although the description below refers to the IFA controller 117 as being executed at management console 118, in another aspect, one of the network applications may be configured to operate as an IFA controller.

It is noteworthy that a server 102, as referred to herein, may include a computer, server or other similar devices, which may be coupled to storage systems. In general, an adapter 114 may be connected to, or be included as part of, a server (102), a router, a computer, or other network component.

Figure 1B:
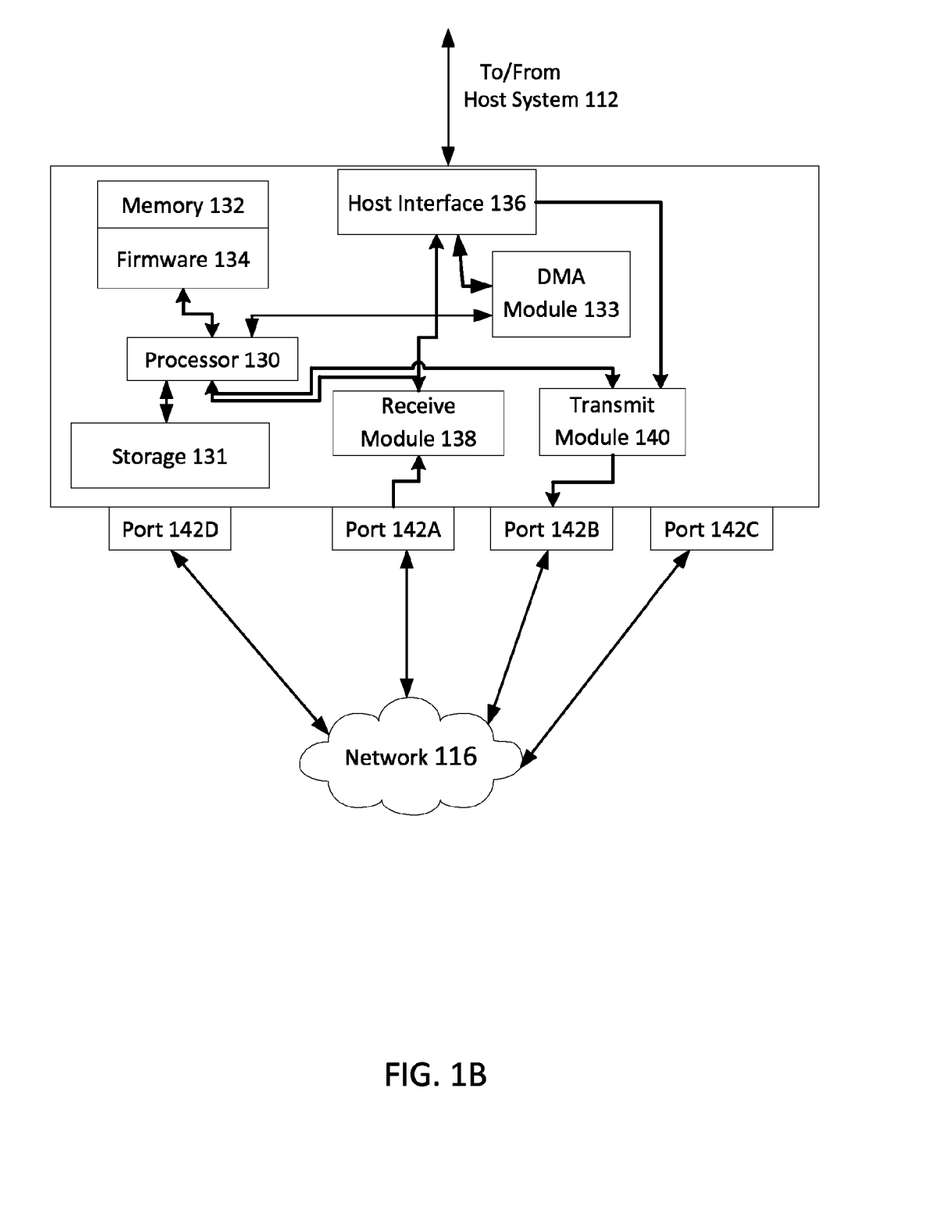
FIG. 1B is a block diagram of an adapter (or network interface card), according to one aspect of the present disclosure.

Adapter 114:

FIG. 1B illustrates an example adapter 114 according to one aspect. In general, adapter 114 comprises a processor 130 and memory 132 which stores firmware 134 for operating various aspects of the adapter 114. Memory 132 may also be used to store various data structures used by the various aspects of the present disclosure, as described below in detail. Adapter 114 also includes a local storage device 131, for example, non-volatile flash memory for storing adapter parameters, configuration information and other information.

The adapter 114 further includes a host interface 136 for communicating with, for example, server 102 through its adapter interface 110 and link 112. In one aspect, the adapter 114 also comprises a receive module 138 and a transmit module 140 that interact with host interface 136 and a port 142. The receive module 138 handles incoming communications from the network 116 and may process them with processor 130 and/or forward the communications to the host interface 136. Similarly, the host interface 136 accepts communications from the server 102 and sends them to transmit module 140 for processing to forward through one of ports 142A-142D (may also be referred to as port 142 or ports 152) out to the network 116. Ports 142A-142D include logic and circuitry for providing a physical interface to receive and send information via network 116. The nature of the logic and circuitry depends on the protocol used for network communication.

Adapter 114 also includes a direct memory access (DMA) module 133 that manages access to link 112 for sending and receiving information. In one aspect, DMA transfers are made for moving data and status between storage locations at adapter 132 (for example, at the receive and/or transmit modules 138 and 140 as well as memory 132) and host memory 106.

Figure 1C:
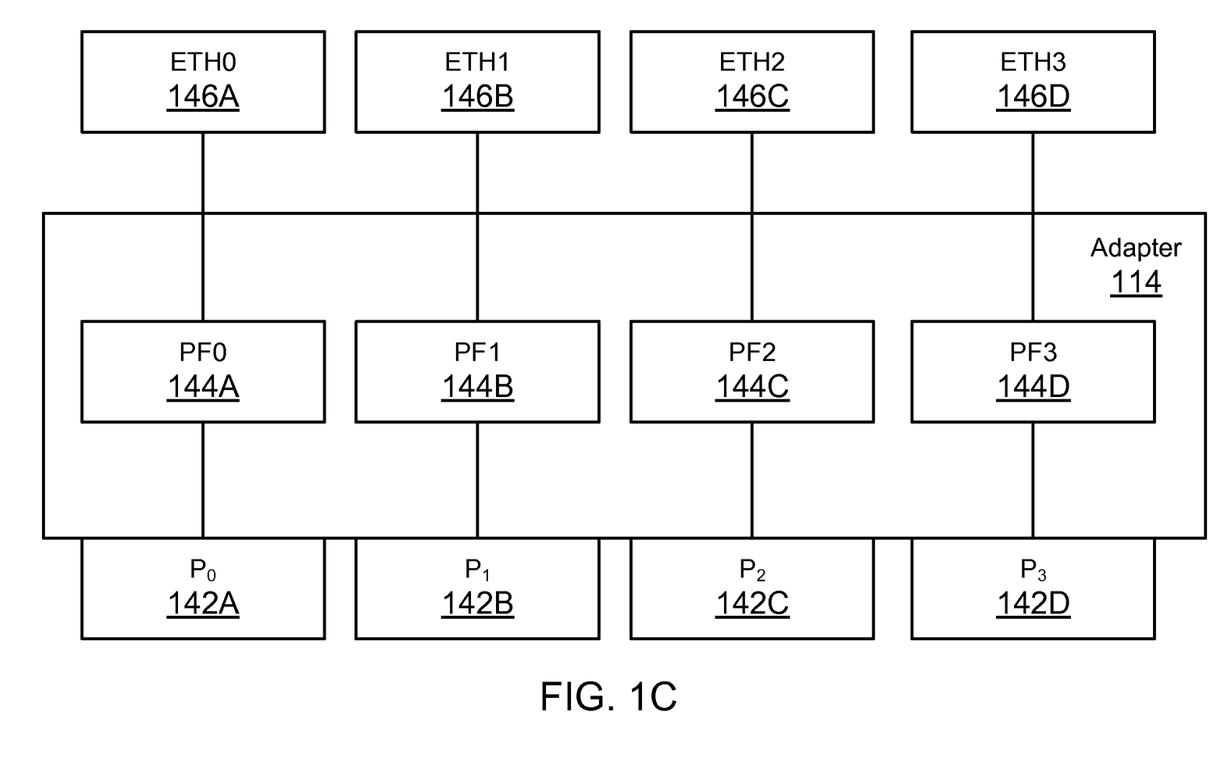
FIG. 1C is a block diagram showing shortcomings of conventional adapters.

FIG. 1C shows a conventional implementation for using adapter 114. Each port 142A-142D is presented as an Ethernet port to a host executable interface, Eth0-Eth3 146A-146D through a Physical Function (PF), for example, PF0 144A, PF1 144B, PF2 144C and PF3 144D. In one aspect, Eth0-Eth3 is a software interface or device identifier presented by a host operating system as being associated with PFs 144A-144D/Ports 142A-142D. PF is a PCI Express (PCIe) function of a network interface card that supports a single root I/O (input/output) virtualization (SRIOV) interface. A PF includes hardware resources including registers, memory, logic, circuitry and other components. The PF includes the SRIOV Extended Capability in a PCIe Configuration and address space. The extended capability is used to configure and manage the SR-IOV functionality of the network adapter, such as enabling virtualization and exposing PCIe Virtual Functions (VFs).

In a traditional network adapter, each PF is bound to an external port, for example, PF0 is bound to port P0 142A and so forth. When a frame is received at a port, it is forwarded to an application, via a DMA operation. To route the frame via another port, the frame has to follow back to the transmit path and then the transmit module is used to transmit the frame. This is inefficient and consumes both host and adapter resources, hence is undesirable.

In conventional implementations, the adapter 114 is not able to route the frame that is received at one port, for example, port P0 142A via another port, for example, Port P1 142B. This is undesirable, especially in a virtual machine and cloud environment, where the network adapter is shared and has to route frames not only to the virtual machines using VFs but also to other ports and devices. The various aspects disclosed herein provide a better solution, as described below in detail with respect to FIG. 2A.

Figure 2A:
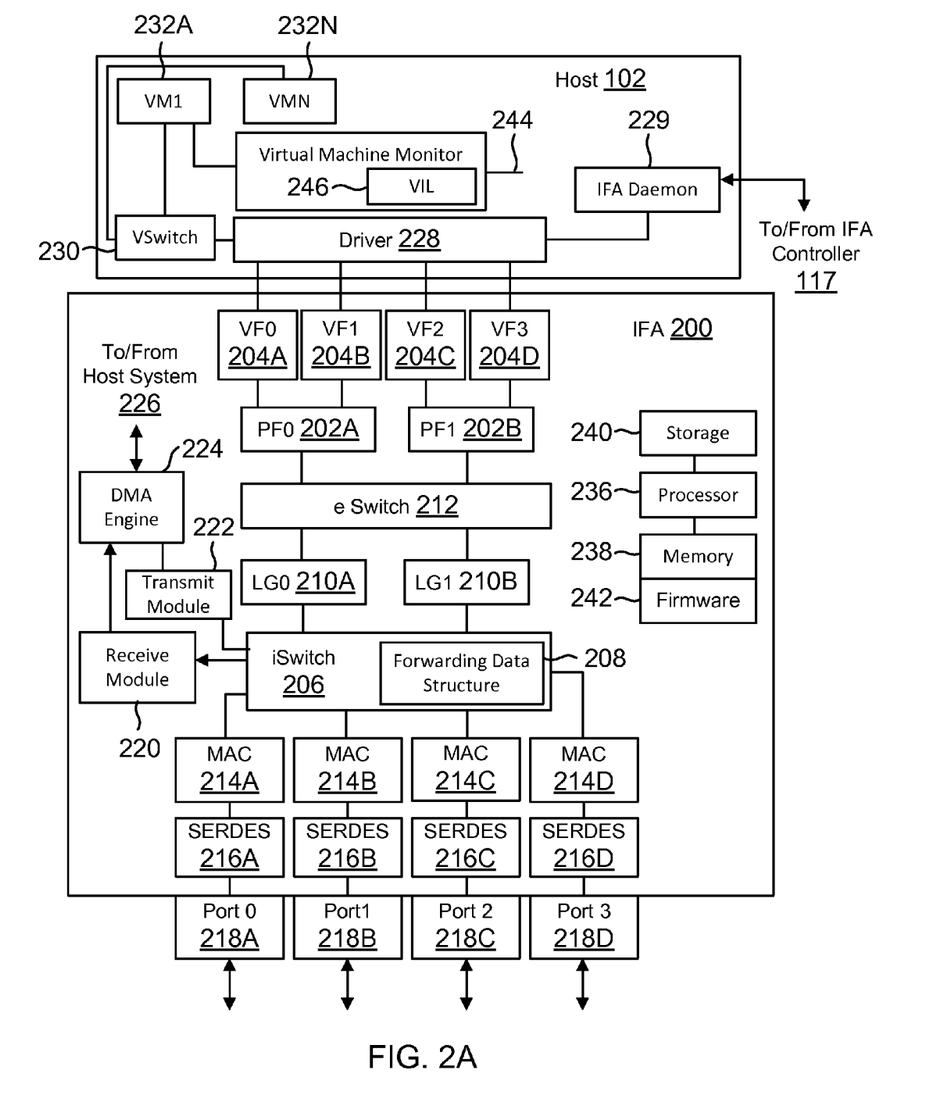
FIG. 2A is a block diagram of an integrated fabric adapter (IFA), according to one aspect of the present disclosure.

IFA 200:

FIG. 2A shows an example of an integrated fabric adapter (IFA) 200, according to one aspect. Some of the components of IFA 200 are similar to the components of adapter 114 and hence for brevity sake are not described again in detail. For example, processor 236, memory 238, firmware 242 and storage 240 are similar to processor 130, memory 132, firmware 134 and storage 131 described above with respect to FIG. 1B. Transmit module 222 is similar to transmit module 140 and receive module 220 is similar to receive module 138.

As an example, IFA 200 enables DMA operations to send a received frame to host memory 106, switch frame to another port of the IFA, broadcast frames to other ports, encapsulate and de-capsulate a frame.

FIG. 2A shows host system 102 executing a virtual environment that supports SRIOV as specified by the PCI Express specification that allows direct mapping of physical hardware resources/functions to virtual machines using VFs, as described below in detail. The virtual environment includes a virtual machine monitor (VMM) 244 for presenting a plurality of virtual machines (VMs) 232A/232N at one or more computing systems. In one embodiment, VMs 232A-232N may be used to present different operating system environments to clients, for example, Windows® based, Linux operating system, Solaris® and others. The operating systems may be referred to as guest OS.

An example of a VMM 244 maybe the Hypervisor layer provided by VMWare Corporation or the Hyper-V layer provided by Microsoft Corporation, (without derogation of any trademark rights owned by VMWare Corporation and/or Microsoft Corporation). It is noteworthy that different vendors may provide different virtual operating environments and the adaptive embodiments disclosed herein may be modified to accommodate the different virtual environments. In one embodiment, VMM 244 may be executed at a same computing device 102 used for presenting the virtual machines or at a separate computing device.

In one embodiment, VMM 244 includes or executes a virtual interface layer (VIL) 246 that presents hardware based physical resources to VMs 232A-232N. Hardware resources include IFA 200, storage space, processors, memory and other devices. VIL 246 allocates resources for VMs 232A-232N and manages physical hardware resources. A driver 228 is executed by VMM 244 or interfaces 244 for communicating with IFA 200 via a plurality of VFs 204A-204D. Each VF may be assigned to a VM. Multiple VFs may be associated with the same PF, for example, VF0/VF1 is associated with PF0 202A, while VF2 and VF3 are associated with PF1 202B. The virtual environment executes a software based or virtual switch (vSwitch) 230 that is used to route frames among the virtual machines.

IFA 200 includes multiple serial/de-serializers (SERDES) 216A-216D and media access control (MAC) modules 214A-214D. Each MAC and SERDES is associated with or may be a part of a port. Frames that are received at ports 218A-218D are processed by the respective SERDES and MAC modules and then provided to a switching module (shown as iSwitch 206). The iSwitch 206 includes a forwarding data structure 208 that is used for routing the frame. For example, if the frame is for a particular VM then it is routed to the VM via an eSwitch 212 and vSwitch 230. If the frame is for another device (i.e. external to host 102 and IFA 200), then the frame is not sent to the host system and instead routed to the destination via the appropriate port of IFA 200. As an example, forwarding data structure 208 may be stored at a content addressable memory (CAM) or ternary CAM (TCAM) programmed by driver 228. When a frame is received, it is matched against a CAM entry, as described below. If a match is found, then a matching action is executed.

In one aspect, the forwarding data structure 208 may have two segments that may be setup by driver 228 or any other processor executable module, for example, the IFA controller 117. A first segment is for routing frames by the eSwitch 212 to one of the machines and the second segment for routing frames to an external port. The first segment stores a virtual local area network (VLAN) identifier (VID), a logical port number identifying logical ports 210A-210B and a MAC address. The VLAN ID identifies a VLAN of which the port is a member. When a frame address fields match the MAC and logical ports, the frame is routed to the appropriate VM via one of the logical ports.

The second segment of the forwarding data structure 208 stores a source port number identifying the port that sent a frame, a VID identifying a VLAN, a destination MAC address and a physical port list identifying the different ports of the IFA that are associated with the VID and can communicate with the destination port. When a frame with an external destination is received, then the second segment of the forwarding data structure 208 is used to match the VLAN ID and the MAC address. If there is a match, then the frame may be forwarded or replicated for all the IFA ports that are associated with the VLAN ID (identifier) and the MAC address.

Table I below shows an example of the first segment of the forwarding data structure 208. It is noteworthy that the first segment may be stored at eSwitch 212, when eSwitch 212 is implemented in hardware. Table II below shows an example of the second segment of the forwarding data structure 208 for routing to external devices.

TABLE I eSwitch Forwarding data structure
208 (First Segment)

| VID | MAC | Logical Port |
|-----|-----|--------------|
| 1 | mac1 | 0 |

TABLE II iSwitch Forwarding data structure 208
(Second Segment)

| Src Port | VID | MAC | Physical Port list |
|----------|-----|-----|--------------------|
| 0 | 1 | mac1 | 0, 2, 3 |

For broadcast frames, the driver 228 sets up an entry for a broadcast MAC. When a frame is received with a multicast bit set, then a lookup occurs based on the broadcast MAC address.

In one aspect, the forwarding data structure 208 may be modified by driver 228. Modifying a port list is an atomic operation and so that removing or adding an existing entry does not result in error.

In one aspect, MAC addresses may be programmed by the IFA controller 117 via driver 228. If any network node is unreachable, then the forwarding data structure 208 is modified. When a frame of unknown destination is received by IFA 200, then the IFA controller 117 is notified so that it can program the address. When a frame is received from an unknown source, no action may be taken or the frame may be forwarded to the IFA controller 117. For example, if the frame is received from an unknown source on an uplink for an IFA, it may be forwarded to the IFA controller 117. For non-uplink IFA ports, the frame may be ignored. This enables optimum utilization of the storage space at the forwarding data structure 208. When the forwarding data structure 208 becomes full or reaches a certain level, then the data structure may be purged by deleting the least recently used memory slots used for storing routing information described above.

iSwitch 206 presents one or more logical ports 210A-210B to eSwitch 212 for routing incoming frames to the appropriate VM, as described below in detail.

In one aspect, a port of IFA 200 may be configured as an "IFA" port. This enables the IFA firmware 242 to expose a single logical port for multiple IFA ports of IFA 200. The driver 228 only sees the logical port and the IFA 200 firmware uses a reserved logical port number for the IFA ports. Non-IFA ports operate as typical NIC ports. If an IFA port goes offline, then the iSwitch 206 generates an asynchronous event to notify driver 228 at the host system 102.

In one aspect, management console 118 may use the Link Layer Discovery Protocol (LLDP) a vendor-neutral link layer protocol in the Internet Protocol Suite used by network devices for advertising identity, capabilities, and neighbors on an IEEE 802 local area network, principally wired for Ethernet. In one aspect, firmware 242 may disable LLDP termination. When disabled, firmware 242 may be configured to process proprietary TLVs (tag-length value) frames before forwarding them to the host processor.

In one aspect, firmware 242 enables configuration of IFA ports to operate in an environment that uses DCBx (i.e. Data Center Bridging, a set of enhancements to Ethernet to operate efficiently in a storage data center environment). This may be used to manage congestion. For example, if an output queue at an IFA port is beyond a threshold limit (also referred to as a watermark), a pause frame is sent to either an IFA port or the host CPU. Once a pause frame is received, frame transmission is paused.

In aspect of the present disclosure, an IFA daemon 229 may be executed. In the Linux environment, the daemon is executed in the user space. The IFA daemon is responsible for terminating and initiating communication with the IFA controller (for example, management application 117), launching IOCTLs (device Input Output Control commands) to driver 228 and handling commands. In one aspect, IFA daemon is configured to communicate using the OpenFlow protocol and hence operates as an OpenFlow agent. OpenFlow is a communication protocol that enables controllers to determine the path of network frames through the network of switches. The OpenFlow protocol was established by the Open Network Foundation having various members. An OpenFlow controller is an application (e.g. IFA controller 117) that manages flow control in a software-defined networking (SDN) environment.

In one aspect, IFA daemon 229 maintains a TCI/IP connection with the IFA controller 117. The IFA daemon 229 maintains a configuration data structure for storing an IP address and port number information for communicating with the IFA controller 117. In one aspect, the IFA daemon 229 receives OpenFlow commands from the IFA controller 117 and then issues IOCTL to driver 228 to modify the forwarding data structure 208. The IFA daemon 228 may also receive undelivered frames from the driver 229 and provide the same to the IFA controller 117.

Figure 2B:
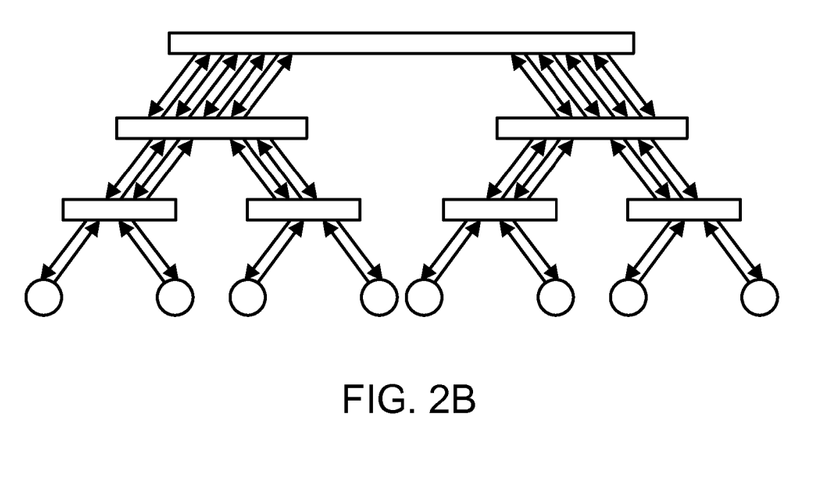
FIG. 2B shows a conventional network topology.

Conventional data center architecture relies on a hierarchical topology, as shown in FIG. 2B. The conventional hierarchy uses redundant devices, for example, adapters, switches and others. To expand the data center, one typically has to incur additional costs for expanding the hardware infrastructure.

Figure 2C:
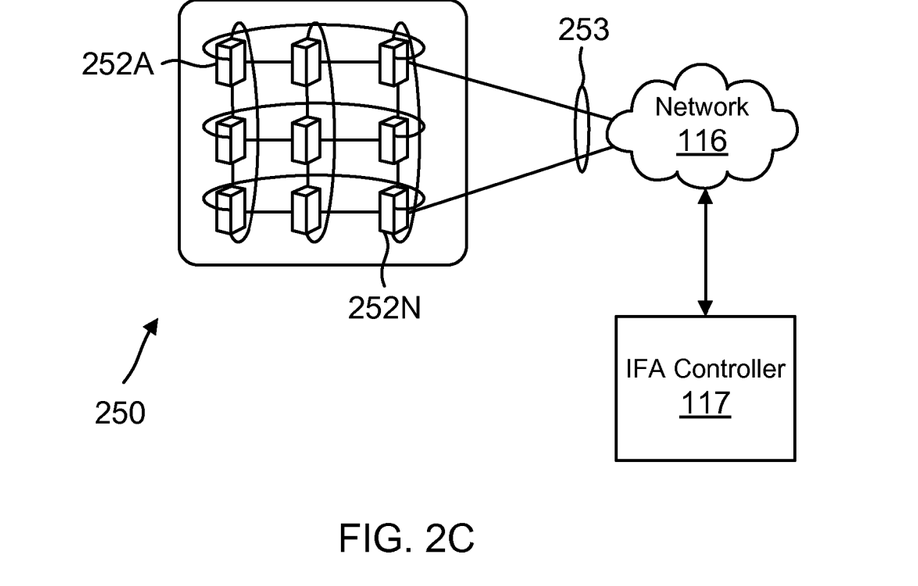
FIG. 2C shows an IFA cluster in a Torus topology, according to one aspect of the present disclosure.

An IFA cluster may instead be used within a data center. In one aspect, the IFA cluster includes more than one IFA 200 coupled to at least one host system or server. In another aspect, the IFA cluster includes a plurality of servers connected through IFA ports, which provides a loop-free topology for fault tolerance, dynamic path computation and with load balancing abilities. In one aspect, an Ethernet network may be operationally coupled to the IFA cluster with an IFA uplink. The IFA uplink may connect a Torus network of IFAs to external switches. An example of an IFA cluster 250 in a Torus network topology is shown in FIG. 2C with a plurality of IFA nodes 252A-252N. An IFA node is a server with IFA 200 having one or more IFA ports. In the IFA cluster 250, servers in a rack are connected in the Torus topology and the servers may use one 4-port IFA or a 2-port IFA for internal communication within the torus network. The IFA cluster 250 may be coupled to an external switch 253 for communication with external networks, for example, 116.

The IFA cluster has advantages over conventional networks. For example, multiple physical connections between servers ensure high availability. If one link fails, new optimum paths may be assigned. A route with minimum hops may be used for communication between the cluster nodes or uplink with an external network. The Torus links may be used to distribute network bandwidth across different routes to maximize link utilization. Furthermore, routes may be modified based on user initiated policy of configuration changes. It is noteworthy that the various aspects of the present disclosure are not limited to the Torus topology and other configurations may be used for the IFA cluster.

For implementing the IFA cluster 250, network topology discovery may be performed using the LLDP protocol between IFA ports. The LLDP payload carries node and port information. On receiving a LLDP frame at an IFA 200 from another IFA, the IFA 200 notifies the IFA controller 117. The IFA controller 117 is also notified when there is a link failure or topology change.

The Torus network topology provides shorter paths across nodes and multiple redundant paths so that it can withstand multiple link failures. If there are redundant links or broadcast messages, they can be managed by the adaptive aspects of the present disclosure. For example, in one aspect, IFA clusters may use the STP (Spanning Tree Protocol) for optimizing redundant links and broadcasts. STP may be used to calculate a single path from a root node (or IFA), where any IFA may be assigned to be a root node. STP may be used to keep ports of a root tree in a forwarding state while other ports are in a blocked state. If there is a link failure the tree may be recalculated and the forwarding states of the ports are reprogrammed. In another aspect, Rapid Spanning Tree Protocol (RSTP) may be used to expedite tree formation upon link failure. RSTP is a variant of STP. In yet another aspect, MSTP (Multi Spanning Tree Protocol) may be used to calculate multiple spanning trees, where different VLANs are assigned to each spanning tree. This ensures that all links are utilized for multi-VLAN traffic, if the spanning trees are efficiently assigned.

Figure 2D:
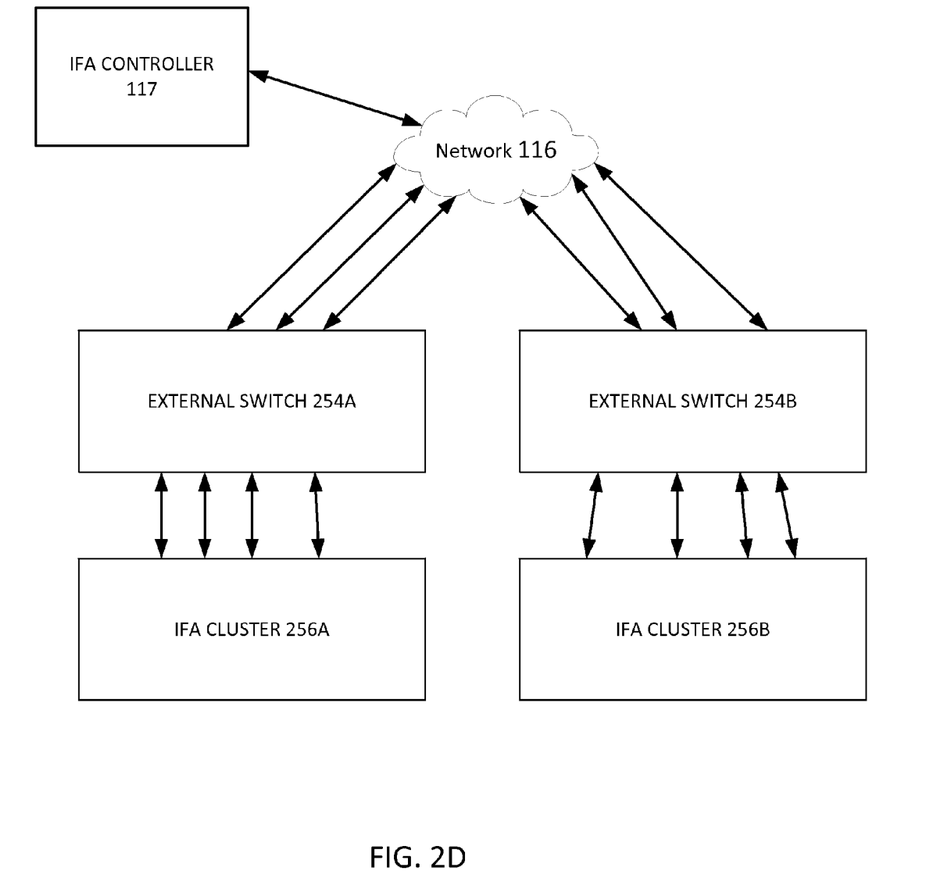
FIG. 2D shows another example of an IFA cluster connected to an external network, according to one aspect of the present disclosure.

FIG. 2D shows another example, where multiple IFA clusters 256A-256B (similar to IFA cluster 250 of FIG. 2C) are connected via Ethernet switches 254A and 254B to network 166 that is external to the IFA clusters 256A and 256B. The IFA clusters uses IFA ports to connect to switches 254A/254B that are in a data center. Each IFA port is configured as an uplink port and may appear as a regular layer 2 (L2) (or L2) switch port to another switch (for example, 254A/254B) or other devices in the network. An L2 switch or device connected to an IFA cluster through an uplink views the IFA cluster as a cluster of servers connected through a L2 switch. In one aspect, iSwitch 206 may be configured to support a maximum number of VLANs, MAC addresses, layer 2 multicast groups, spanning tree instances, use pause frames for flow control and allow link aggregation.

In one aspect, the IFA controller 117 controls routing and configuration of the IFAs within each IFA cluster. The IFA controller 117 listens for events within the IFA cluster or receives notifications via a user interface (not shown). When an event occurs, the IFA controller 117 processes the event and takes an appropriate action. As an example, there may be two event types, port events and protocol events.

A port event may be generated when there is a server failure, link/port addition or removal, change in connectivity of an uplink or a user initiated topology change. The IFA controller 117 coalesces port events, analyzes them and makes appropriate configuration changes.

Protocol events are traffic related events and may not be considered critical. However, if an IFA is operating beyond its scalability limit, then traffic may slow down due to rapid learning and aging of destination addresses. Here are a few examples of protocol events, destination lookup failure, congestion alert, receiving out of order frames, user initiated changes to VLAN, ACL (access control list) and others. When a protocol event is received, the IFA controller 117 adds/removes flow entries from one or more IFAs. Some events are recorded and no action may be performed.

In aspect, IFA 200 traps a local frame for the host processor 104 and switches non-local frames to iSwitch 206. If there is a lookup miss, the frame can be dropped or delivered to the IFA driver 228 that sends the frame to the IFA controller 117.

In one aspect, IFA 200 delivers broadcast messages based on a spanning tree generated by the IFA controller 117. The IFA controller 117 discovers an adjacency list listing various IFA ports, when an event notification is received from one of the IFA nodes. The IFA controller 200 may randomly select a node in a cluster as a root node and create a spanning tree at that node. The IFA nodes set their ports to a "blocked" or "forwarding state" based on updates/commands from the IFA controller 117. A broadcast frame may be forwarded to all ports in a forwarding state.

For multicast frames, the IFA node looks up a destination at the forwarding data structure 208 and on finding an entry, the frame is delivered to the appropriate port(s). If there is a miss, the frame is handled similar to a broadcast frame.

If a destination address is not available for a received frame, then IFA 200 handles the frame based on an action specified in a configuration register (not shown) at the IFA 200. For example, a configuration register may store different actions for frames that do not have a matching destination address, including, dropping the frame, delivering the frame to the host processor and others.

In one aspect, ACLs may be used for certain action types. Data structure 208 described above may be used to store key and action values. The key may be identified by an offset value, mask, or value field for a received frame. The action may specify dropping, forwarding, modifying or redirecting the frame. Each action may have an associated priority.

When a frame may match multiple keys, then the action picked based on the highest priority action.

In one aspect, if one IFA 200 of a cluster 250 becomes unavailable, then a neighboring IFA node notifies the IFA controller 117. The IFA controller 117 may then execute a discovery protocol to discover the topology, rebuild routes and update forwarding data structure 208.

Figure 3:
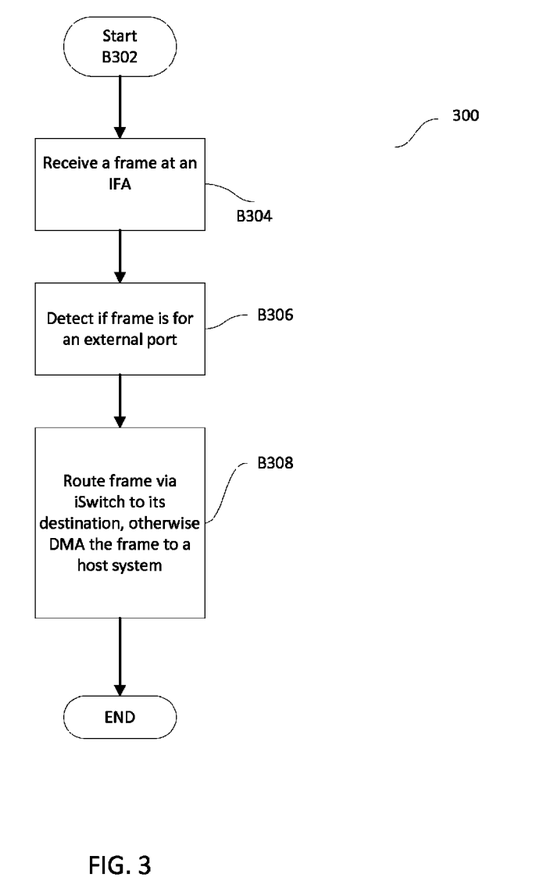
FIGS. 3-4 are process flow diagrams for using the integrated fabric adapter, according to one aspect of the present disclosure.

Process Flow:

FIG. 3 shows a process 300 for processing frames received at one of the IFA 200 ports, according to one aspect of the present disclosure. The process begins in block B302, when IFA 200 is initialized and operational. In block B304, a frame (may also be referred to as packet or information) is received by the IFA 200. In block B306, IFA 200 using the forwarding data structure 208 to determine that the frame is for an external port. As described above, IFA 200 checks the VLAN ID and the destination port to determine that. If there is a match, then the frame is routed to all the ports of IFA 200 that match the destination MAC and the selected port then transmits the frame in block B308. If the frame is not for an external port, then the frame is routed to the host system using a logical. In one aspect, a DMA operation is used to send the frame to the host. The process then ends.

Figure 4:
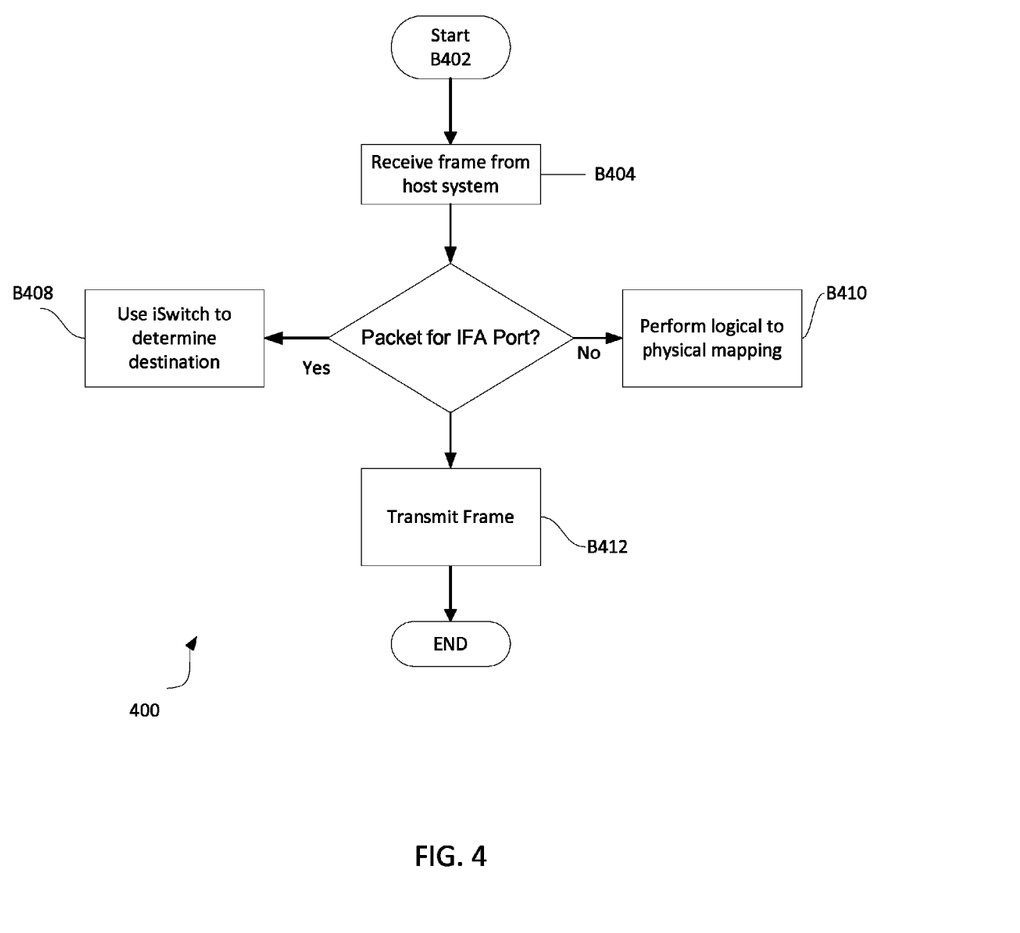

FIG. 4 shows a process 400 for processing a frame received by the IFA 200 from the host system 102, according to one aspect. The process begins in block B402 when both IFA 200 and the host system 102 are operational. In block B404, a frame is received from the host system 102. IFA 200 determines if the frame is for an IFA port. An IFA port is part of an IFA where multiple IFA ports can be aggregated. If the frame is for an IFA, then in block B408, the forwarding data structure 208 is used to determine the destination MAC and then the frame is transmitted in block B412. If the frame is not for an IFA port, then the physical port that is mapped to the logical port (i.e. 210A/210B) is obtained. The frame is transmitted in block B412 and the process ends in block B414.

Although the present disclosure has been described with reference to specific aspects, these aspects are illustrative only and not limiting. For example, although the description above has been described with respect to an adapter, any other device, such as a router, a switch, a computer, a server, or the like may be configured to perform the foregoing function. Additionally, the description herein provides a number of examples in relation to a storage system, but the teachings are equally applicable to other general or special purpose networking systems. Many other applications and aspects of the present disclosure will be apparent in light of this disclosure and the following claims. References throughout this specification to "one aspect" or "an aspect" means that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

What is claimed is:

1. A network adapter, comprising:
  a plurality of virtual functions used by a driver of a computing device to access one or more plurality of physical functions of the network adapter, where more than one virtual function is associated with a same physical function;
  a plurality of physical ports for sending and receiving frames;
  a first switch of the network adapter interfacing with a third switch of a computing device for routing frames between virtual machines executed by the computing device; and
  a second switch of the network adapter presenting a plurality of logical ports to the first switch to route frames between the virtual machines via the first switch and the third switch using direct memory access operations;
  wherein the network adapter maintains a routing data structure having a first segment for routing frames between the virtual machines by the first switch and a second segment for routing frames to an external destination using one of the physical ports by the second switch; and
  wherein the first segment stores a virtual local area network (VLAN) identifier value, a logical port identifier and a media access control value and the second segment stores a source port identifier for frames received at one or more of the physical ports of the network adapter, a virtual local area network (VLAN) identifier value, a destination media access control (MAC) identifier and a port identifier identifying a physical port associated with the VLAN identifier value.

2. The network adapter of claim 1, wherein the first switch maintains the first segment at a ternary content addressable memory (TCAM) for routing frames among the virtual machines.

3. The network adapter of claim 2, wherein when a frame is received by the network adapter from the computing device for transmission to a destination virtual machine, the frame includes a destination logical port identifier and the first switch matches the destination logical port identifier with a logical port identifier of the first segment of the routing data structure to route the frame to the destination virtual machine.

4. The network adapter of claim 1, wherein the second switch maintains the second segment of the routing data structure for routing frames received at one or more the plurality of physical ports of the network adapter.

5. The network adapter of claim 1, wherein when the network adapter receives a frame at a physical port, the second switch verifies the frame's source port identifier and a destination MAC identifier with the second segment of the routing data structure and sends the frame to a destination port.

6. The network adapter of claim 1, wherein the network adapter operates within a cluster having a plurality of computing devices with a plurality of network adapters with the first switch and the second switch.

7. The network adapter of claim 6, wherein the cluster is configured in a torus topology.

8. A machine implemented method, comprising:
  maintaining a first segment of a routing data structure at a first switch of a network adapter having a plurality of physical ports for routing frames between virtual machines executed by a computing device operationally coupled to the network adapter; wherein the first switch interfaces with a third switch executed by the computing device for routing frames between the virtual machines and wherein the first segment stores a virtual local area network (VLAN) identifier value, a logical port identifier and a media access control value for routing frames between the virtual machines;

maintaining a second segment of the routing data structure at a second switch for routing frames received at one or more of the plurality of physical ports of the network adapter to a destination external to the network adapter and the computing device; wherein the second segment stores a source port identifier for frames received at one or more of the physical ports of the network adapter, a virtual local area network (VLAN) identifier value, a destination media access control (MAC) identifier and a port identifier identifying a physical port associated with the VLAN identifier value;

presenting a plurality of logical ports by the second switch to the first switch for routing frames between the virtual machines using the first switch and the third switch via direct memory access operations;

receiving a frame from the computing device for transmission to a destination virtual machine and using the first segment by the first switch to route the frame to the destination virtual machine; and receiving a frame at a physical port of the network adapter and using the second segment of the routing structure by the second switch to route the frame to its destination without providing the frame to the computing device.

9. The method of claim 8, wherein the first switch maintains the first segment at a ternary content addressable memory (TCAM) for routing frames among the virtual machines.

10. The method of claim 8, wherein when a frame is received by the network adapter from the computing device for transmission to a destination virtual machine, the frame includes a destination logical port identifier and the first switch matches the destination logical port identifier with a logical port identifier of the first segment of the routing data structure to route the frame to the destination virtual machine.

11. The method of claim 8, wherein a plurality of virtual functions used by a driver of the computing device to access one or more plurality of physical functions of the network adapter, where more than one virtual function is associated with a same physical function.

12. The method of claim 8, wherein when the network adapter receives a frame at a physical port, the second switch verifies the frame's source port identifier and a destination MAC identifier with the second segment of the routing data structure and sends the frame to a destination port.

13. The method of claim 8, wherein the network adapter operates within a cluster having a plurality of computing devices with a plurality of network adapters with the first switch and the second switch.

14. The method of claim 13, wherein the cluster is configured in a torus topology.

15. A system, comprising:
a computing device having a processor executing instructions out of a memory device for executing a plurality of virtual machines; and a network adapter operationally coupled to the computing device having a plurality of physical ports for sending and receiving information via a network, wherein the network adapter comprises of:

a plurality of virtual functions used by a driver of a computing device to access one or more plurality of physical functions of the network adapter, where more than one virtual function is associated with a same physical function;

a first switch of the network adapter interfacing with a third switch of a computing device for routing frames between virtual machines executed by the computing device; and a second switch of the network adapter presenting a plurality of logical ports to the first switch to route frames between the virtual machines via the first switch and the third switch using direct memory access operations;

wherein the network adapter maintains a routing data structure having a first segment for routing frames between the virtual machines by the first switch and a second segment for routing frames to an external destination using one of the physical ports by the second switch; and wherein the first segment stores a virtual local area network (VLAN) identifier value, a logical port identifier and a media access control value and the second segment stores a source port identifier for frames received at one or more of the physical ports of the network adapter, a virtual local area network (VLAN) identifier value, a destination media access control (MAC) identifier and a port identifier identifying a physical port associated with the VLAN identifier value.

16. The system of claim 15, wherein the first switch maintains the first segment at a ternary content addressable memory (TCAM) for routing frames among the virtual machines.

17. The system of claim 16, wherein when a frame is received by the network adapter from the computing device for transmission to a destination virtual machine, the frame includes a destination logical port identifier and the first switch matches the destination logical port identifier with a logical port identifier of the first segment of the routing data structure to route the frame to the destination virtual machine.

18. The system of claim 15, wherein the second switch maintains the second segment of the routing data structure for routing frames received at one or more the plurality of physical ports of the network adapter.

19. The system of claim 15, wherein when the network adapter receives a frame at a physical port, the second switch verifies the frame's source port identifier and a destination MAC identifier with the second segment of the routing data structure and sends the frame to a destination port.

20. The system of claim 15, wherein the network adapter operates within a cluster having a plurality of computing devices with a plurality of network adapters with the first switch and the second switch.

* * * * *